United States Patent [19]
Cain

[11] 3,756,462
[45] Sept. 4, 1973

[54] NUT BOWL
[76] Inventor: Harvey D. Cain, 126 Moffatt Way, Sacramento, Calif. 95825
[22] Filed: Mar. 3, 1972
[21] Appl. No.: 231,541

[52] U.S. Cl. ............................................. 220/23.83
[51] Int. Cl. ...................... B65d 21/02, A47g 19/00
[58] Field of Search ................ 220/20, 23.83, 23.86

[56] References Cited
UNITED STATES PATENTS
3,224,625  12/1965  Sperl ................................ 220/23.83
2,101,401  12/1937  Leppke ..................... 220/23.83 UX

*Primary Examiner*—George T. Hall
*Attorney*— Alexander B. Blair and Elton H. Brown, Jr.

[57] ABSTRACT

A nut bowl having a central upstanding circular portion with a shell bowl having a central bore engageable over the upstanding portion to support the shell bowl centrally and above the nut bowl. The nut bowl is partitioned with radial partitions to separate varying kinds of nuts. The shell bowl is removable from the nut bowl to empty the shells therefrom without disturbing the nuts in the nut bowl.

5 Claims, 6 Drawing Figures

NUT BOWL

BACKGROUND OF THE INVENTION

Field of the Invention

The present invention relates to nut bowls and particularly to nut bowls having a section for the shells.

SUMMARY OF THE INVENTION

The nut bowl of the instant invention includes a central circular member extending above the nut bowl and adapted to support a shell bowl having a bore through which the central member extends. The shell bowl can be removed from the nut bowl without disturbing the nuts in the nut bowl and the nut bowl is partitioned with radial partitions to divide the varying kinds of nuts held therein.

The primary object of the invention is to provide a combined nut and shell bowl to keep the nuts and shells segregated.

Other objects and advantages will become apparent in the following specification when considered in the light of the attached drawings.

DESCRIPTION OF THE PREFERRED EMBODIMENT

Figure 1:
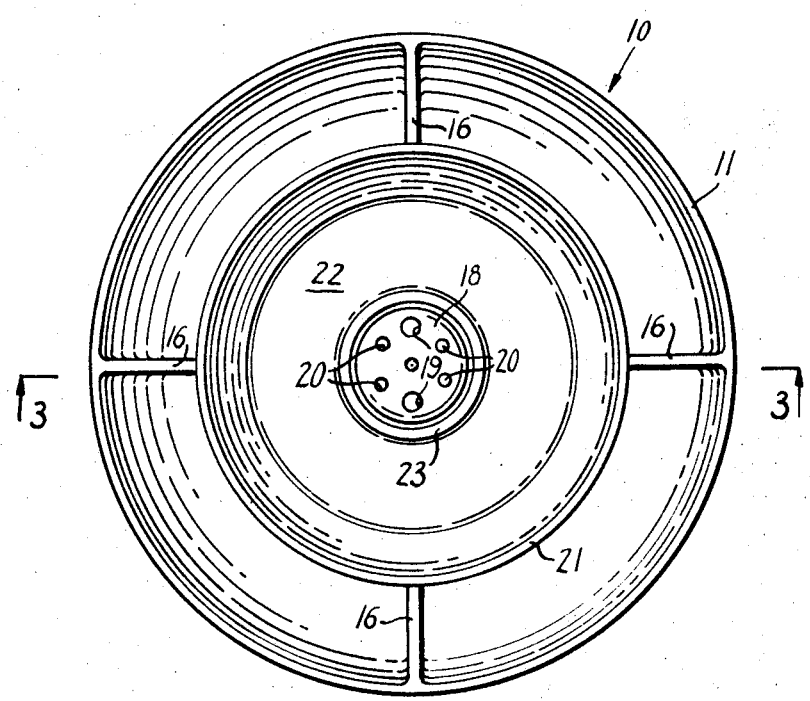
FIG. 1 is a top plan view of the invention.
Figure 2:
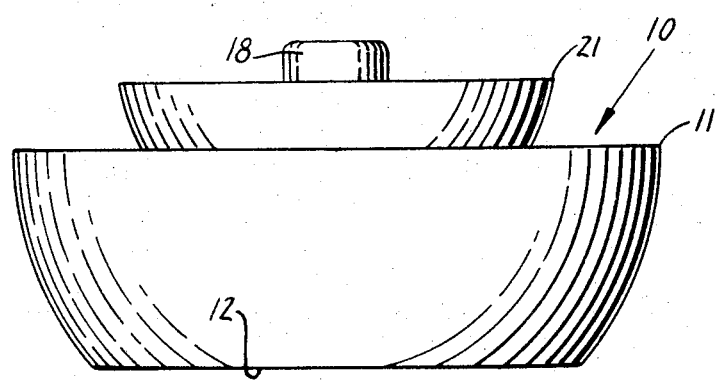
FIG. 2 is a side elevation of the invention.

Referring now to the drawing in detail wherein like reference characters indicate like parts throughout the several figures the reference numeral 10 indicates generally a combined nut and shell bowl unit constructed in accordance with the invention.

The unit 10 includes an open top circular bowl 11 having a flat bottom 12 integrally formed thereon. A generally cylindrical upstanding base 13 is integrally formed with the bottom 12 and extends upwardly therefrom. A hollow generally cylindrical member 14 extends upwardly from the base 13 and has a diameter substantially less than the base 13 to provide a circular horizontal ledge 15.

Figure 3:
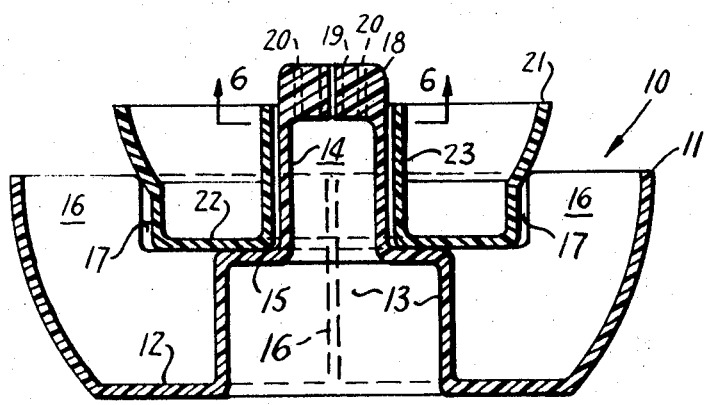
FIG. 3 is a vertical sectional view taken along the line 3—3 of FIG. 1 looking in the direction of the arrows.
Figure 4:
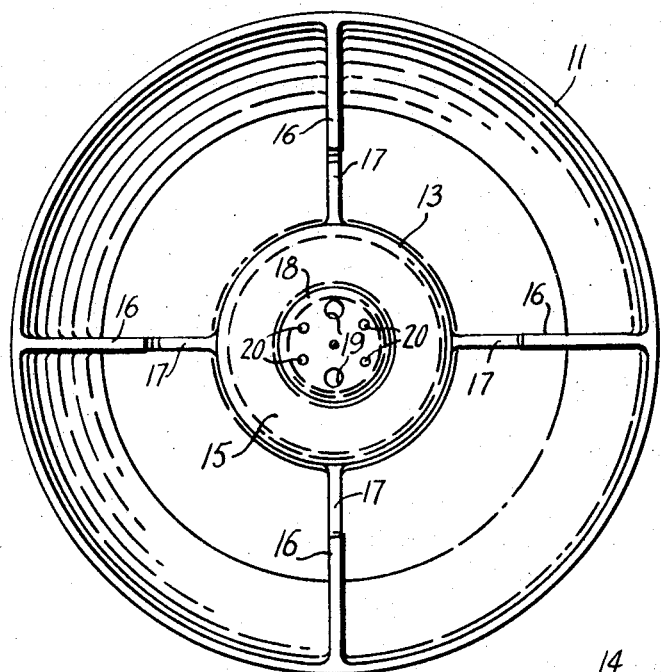
FIG. 4 is a top plan view of the nut bowl with the shell bowl removed.
Figure 6:
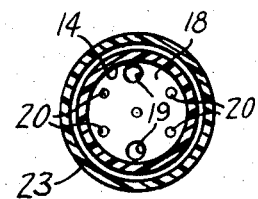
FIG. 6 is a horizontal cross section taken along the line 6—6 of FIG. 3 looking in the direction of the arrows.
Figure 5:
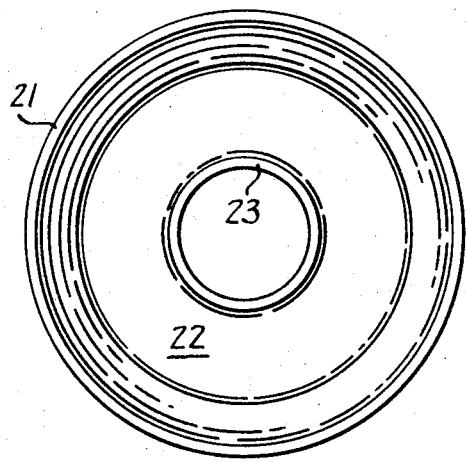
FIG. 5 is a top plan view of the shell bowl removed from the nut bowl.

A plurality of radial partitions 16 extend inwardly of the bowl 11 terminating at the circular base member 13. Each of the partitions 16 has a recess 17 formed therein with the lower edge of the recess 17 being at the same height as the ledge 15. The member 14 has a top wall 18 with a pair of bores 19 positioned to receive a nut cracker (not shown). Additional smaller bores 20 are formed in the top 18 to support nut picks which are adapted to be placed therein. A generally circular shell bowl 21 has a flat bottom wall 22 which is adapted to rest on the ledge 15. A hollow cylindrical tube 23 opens through the bottom wall 22 and extends upwardly through the shell bowl 21. The cylindrical tube 23 is adapted to engage over the cylindrical member 14 as can be seen in FIG. 3 to support the shell bowl 21 on the ledge 15 centrally of the nut bowl 11.

In the use and operation of the invention various edible nuts are placed in the bowl 11 divided by the partitions 16 and the shell bowl 21 is mounted thereon to receive the shells. Nuts are shelled using conventional methods and the shells are placed in the shell bowl 21. When it is desired to empty the shell bowl 21 it is merely lifted off of the cylindrical member 14, emptied in a convenient rubbage receptacle and returned to the nut bowl 11 without disturbing the nuts still remaining in the nut bowl 11.

Having thus described the preferred embodiment of the invention it should be understood that numerous structural modifications and adaptations may be resorted to without departing from the spirit of the invention.

I claim:

1. A combined nut and shell bowl unit comprising a partitioned nut bowl, a generally cylindrical base mounted in said bowl and extending upwardly therein, a generally cylindrical member having a diameter substantially less than said base integrally formed with said base and extending upwardly therefrom to form a generally circular ledge connecting said base and said member, and a shell bowl supported on said member.

2. A deivce as claimed in claim 1 wherein said shell bowl has an upright cylindrical tube integrally formed thereon for engaging over said member with said shell bowl resting on said ledge.

3. A device as claimed in claim 2 wherein said tube extends axially of said shell bowl.

4. A device as claimed in claim 3 wherein said base and said member extend axially of said nut bowl.

5. A device as claimed in claim 4 wherein means are provided on the upper end of said member for supporting nut crackers and nut picks.

* * * * *